(12) United States Patent
Saitoh et al.

(10) Patent No.: US 7,062,945 B2
(45) Date of Patent: Jun. 20, 2006

(54) DOOR HANDLE APPARATUS

(75) Inventors: Hajime Saitoh, Wako (JP); Kazuhiko Yamada, Wako (JP); Tomofumi Ichinose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/931,757

(22) Filed: Sep. 1, 2004

(65) Prior Publication Data

US 2005/0057050 A1   Mar. 17, 2005

(30) Foreign Application Priority Data

Sep. 2, 2003   (JP) .............................. 2003-310665

(51) Int. Cl.
  *E05B 49/00* (2006.01)
(52) U.S. Cl. .......................... 70/278.1; 49/460; 49/502
(58) Field of Classification Search .................. 49/460, 49/502; 70/278.1, 278.2, 278.3, 277, 432; 292/336.3, 347; 307/10.1; 340/5.53
  See application file for complete search history.

(56) References Cited

U.S. PATENT DOCUMENTS

| 6,075,294 | A  * | 6/2000 | Van den Boom et al. . 307/10.1 |
| 6,241,294 | B1 * | 6/2001 | Young et al. ............. 292/336.3 |
| 6,431,643 | B1 * | 8/2002 | Grey .......................... 296/214 |
| 6,577,226 | B1 * | 6/2003 | Steiner ..................... 340/5.62 |
| 6,577,228 | B1 * | 6/2003 | Tsuchida et al. ........... 340/5.72 |
| 6,740,834 | B1 * | 5/2004 | Sueyoshi et al. ........... 200/600 |
| 6,768,413 | B1 * | 7/2004 | Kemmann et al. ......... 340/5.72 |
| 6,848,818 | B1 * | 2/2005 | Huizenga ................... 362/501 |
| 2002/0157436 | A1 * | 10/2002 | Klein ......................... 70/257 |
| 2003/0009855 | A1 * | 1/2003 | Budzynski .................. 16/443 |
| 2003/0029210 | A1 * | 2/2003 | Budzynski et al. ........ 70/278.1 |
| 2003/0101781 | A1 * | 6/2003 | Budzynski et al. ........... 70/239 |
| 2003/0184098 | A1 * | 10/2003 | Aiyama et al. ............. 292/216 |
| 2004/0031908 | A1 * | 2/2004 | Neveux et al. ............. 250/221 |
| 2004/0039511 | A1 * | 2/2004 | Garnault et al. .............. 701/49 |

FOREIGN PATENT DOCUMENTS

| JP | 10-308148 | * | 10/1998 |
| JP | 10-308149 | * | 10/1998 |
| JP | 11-105547 | * | 11/1999 |
| JP | 2002-295094 | | 10/2002 |
| JP | 2005126912 A | * | 5/2005 |

* cited by examiner

*Primary Examiner*—Jerry Redman
(74) *Attorney, Agent, or Firm*—Rankin, Hill, Porter & Clark LLP

(57) ABSTRACT

A door handle apparatus having a door handle 12 which is provided on a back door of an automobile in such a manner as to oscillate freely and a cover member 20 for covering the door handle 12, wherein a detection sensor 30 for detecting the approach of an operator toward the door handle 12 is provided between the door handle 12 and the cover member 20.

13 Claims, 9 Drawing Sheets

DOOR HANDLE APPARATUS

BACKGROUND OF THE INVENTION

The present invention relates to a door handle apparatus, and more particularly to a door handle which is preferably used for a smart entry system equipped on an automobile.

Conventionally, there has been known an automobile which is equipped with, as an automotive security system, a so-called smart entry system in which a recognition code is exchanged between a transmitter-receiver carried by an operator (for example, the driver) and a transmitter-receiver provided on the automobile side, whereby a lock of a door of the automobile is automatically opened when the operator only approaches the door of the automobile, whereas the lock of the door is automatically closed when the operator only leaves from the door.

In this system, proximity sensors are provided on automotive door handle apparatuses D1 to D3 shown in FIGS. 8A to 8C as a trigger unit for executing a recognition process.

For example, in the door handle apparatus D1 using a handle grip H (a door handle) as shown in FIG. 8A, there is a case where an electrostatic capacity-type detection sensor K as shown in FIG. 9 is integrally installed in the handle grip H. In this door handle apparatus D1, a recognition process is designed to be executed by detecting a change in voltage that would occur when the operator P touches the surface of the handle grip H by making use of electrostatic capacity which changes when the touch of the operator P on the handle grip H occurs (for example, refer to a patent document No. 1).

In addition, in the door handle apparatus D2 using a flap F (a door handle) as shown in FIG. 8B, there is a case where an antenna A as shown in FIG. 9B is provided in the interior of a door as a detection sensor. In this door handle apparatus D2, a recognition process is executed by applying a radio wave transmitted from the antenna A to an object such as the fingers of the operator P and then detecting the amount of attenuation of the radio wave and a delay in time due to the reflection of the radio wave on the fingers.

The configurations for executing the recognition process by using the detection sensor K and the antenna A can also be adopted for the door handle apparatus D3 provided with a door handle DH and a cover member C in a back door BD as shown in FIG. 8C.

[Patent Document No. 1]

JP-A-2002-295094 (paragraphs 0015 to 0018, FIG. 2) In the door handle apparatus D1 shown in FIG. 8A, however, since the detection sensor K (refer to FIG. 9A) is constructed to be installed in the handle grip H, there is caused a problem that the size of the detection sensor K is limited, and since a construction is needed to enable the installation of the sensor, there is caused another problem that the design of the handle grip H is limited. In addition, there is caused a further problem that the apparatus D1 is inferior in versatility (application to other types of automobiles).

Incidentally, it is desirable that the smart entry system is constructed so as to allow for a selection of fitment or non-fitment of the system depending on types of vehicles. With the constructions adopted for the detection sensor K and the antenna A shown in FIGS. 9A, 9B, however, the specification needs to be changed largely depending on whether or not the detection sensor K and the antenna A are equipped. Due to this, the construction around the handle needs to be designed so as to allow for a change in specification depending on whether or not the sensor is equipped, and as a result, there is caused a problem that the related cost needs to be increased.

In addition, in the door handle apparatus D1 shown in FIG. 9A, since the detection sensor K is constructed to be integrally installed in the handle grip H, when the detection sensor K fails, there may occur a case where the replacement of parts should be dealt with by replacing the whole door handle apparatus D1, there is caused a problem that the repair cost is increased.

SUMMARY OF THE INVENTION

Then, the invention is made with a view to solving the problems, and an object thereof is to provide a door handle apparatus which can make it difficult for the design properties thereof to be damaged, which can simplify the construction which allows for a selection of fitment of the smart entry system to thereby attempt to reduce costs, and which can simplify the mounting and dismounting of a detection sensor and facilitate the replacement of parts, so that the repair and replacement costs can be reduced which are incurred when the detection sensor fails.

With a view to solving the problems, according to a first aspect of the invention, there is provided a door handle apparatus having a door handle provided on a door of an automobile in such a manner as to swing freely and a cover member for covering the door handle, wherein a detection sensor is provided between the door handle and the cover member for detecting the approach of an operator toward the door handle.

According to the door handle apparatus set forth in the first aspect of the invention, since the detection sensor is provided between the door handle and the cover member, the place of the detection sensor can be realized which makes effective use of a space between the door handle and the cover member. Consequently, the door handle apparatus does not have to adopt the complex construction which resulted with the conventional example in which the detection sensor is integrally installed in the door handle, whereby the design properties of the apparatus are made difficult to be damaged, and more over, the construction which allows for a selection of fitment of the smart entry system can be simplified.

In addition, since the detection sensor is provided between the door handle and the cover member, the place where the detection sensor is installed becomes a part which is situated near an outer part of the door handle apparatus. Consequently, there can be obtained an advantage that the mounting and dismounting work of the sensor is made easy to be performed. Furthermore, when the detection sensor fails, the failure can be dealt with by replacing parts, and therefore, the repair and replacement costs can be reduced.

Moreover, since the detection sensor is covered with the cover member, there occurs no case where the detection sensor is exposed to the outside, and therefore, there is caused no risk that the design properties around the door handle apparatus is damaged.

According to a second aspect of the invention, there is provided a door handle apparatus as set forth in the first aspect of the invention, wherein the detection sensor is mounted on the door handle side.

According to the door handle apparatus set forth in the second aspect of the invention, the detection sensor can be exposed by removing the cover member, whereby there can be obtained an advantage that the mounting and dismounting work of the sensor is made easy to be performed.

According to a third aspect of the invention, there is provided a door handle apparatus as set forth in the first aspect of the invention, wherein the detection sensor is mounted on the cover member side.

According to the door handle apparatus set forth in the third aspect of the invention, the detection sensor can be removed while being attached to the cover member by removing the cover member. Consequently, there can be obtained an advantage that the mounting and dismounting work of the detection sensor is made easy to be performed.

According to a fourth aspect of the invention, there is provided a door handle apparatus as set forth in any of the first to third aspects of the invention, wherein the detection sensor is formed into a flat plate-like shape which extends along a direction in which the cover member extends. Here, the direction in which the cover member extends means a horizontal planer direction of the cover member (this is true hereinafter).

According to the door handle apparatus set forth in the fourth aspect of the invention, since the detection sensor is formed into the flat plate-like shape which extends along the direction in which the cover member extends, the detection sensor can be disposed so as to extend along an inner side of the cover member, thereby making it possible to reduce the exclusive space occupied by the detection sensor which resides between the door handle and the cover member. This can ensure the securement of a space needed for the door handle to oscillate without any difficulty.

According to a fifth aspect of the invention, there is provided a door handle apparatus as set forth in any of the first to fourth aspects of the invention, wherein the detection sensor is fixed by screw a fastening unit which is screwed and fastened from an opposite side to a side where the door handle is operated.

According to the door handle apparatus set forth in the fifth aspect of the invention, the finger tips can be prevented from touching a member or members in association with the screw fastening unit when operating the door handle, thereby making it possible to produce a feeling of physical disorder or discomfort while operating the door handle.

In addition, since the door handle is screw fastened to the opposite side to the side where the door handle is operated, there is caused no risk of tampering with the screw fastening unit from the side where the door handle is operated so as to remove the detection sensor.

According to a sixth aspect of the invention, there is provided a door handle apparatus as set forth in the fifth aspect of the invention, wherein the screw fastening unit includes mounting portions which are provided at a certain interval in the direction in which the cover member extends and screw holes provided in the mounting portions, and wherein the detection sensor is fixed with screws which are inserted into the screw holes.

According to the handle apparatus set forth in the sixth aspect of the invention, since the mounting portions are provided at the certain interval in the direction in which the cover member extends, so that the detection sensor is fixed with the screws which are inserted into the holes in the mounting portions so provided, the holding interval of the detection sensor can be increased. Consequently, the mounting stability and mounting strength of the detection sensor can be ensured.

For example, in the event that the mounting portions are provided on the door handle, the detection sensor can be mounted on the door handle member side, whereas in the event that the mounting portions are provided on the cover member, the detection sensor can be provided on the cover member side.

According to a seventh aspect of the invention, there is provided a door handle apparatus as set forth in the sixth aspect of the invention, wherein the mounting portions are boss portions whose axial direction is the direction in which the cover member extends.

According to the door handle apparatus set forth in the seventh aspect of the invention, the extending direction of the cover member which has an extra space can be made to be the axial direction of the boss portions, and the boss portions can be formed longer in the axial direction thereof. Consequently, the mounting strength by the screw fastening unit can be enhanced.

According to the invention, the design properties are made difficult to be damaged, the construction which allows for a selection of fitment of the smart entry system can be simplified to thereby attempt to reduce costs, and the mounting and dismounting of the detection sensor can be simplified so as to facilitate the replacement of parts, whereby the repair and replacement costs can be reduced which are incurred when the detection sensor fails.

DETAILED DESCRIPTION OF THE PREFERRED EMBODIMENTS

Figure 1:
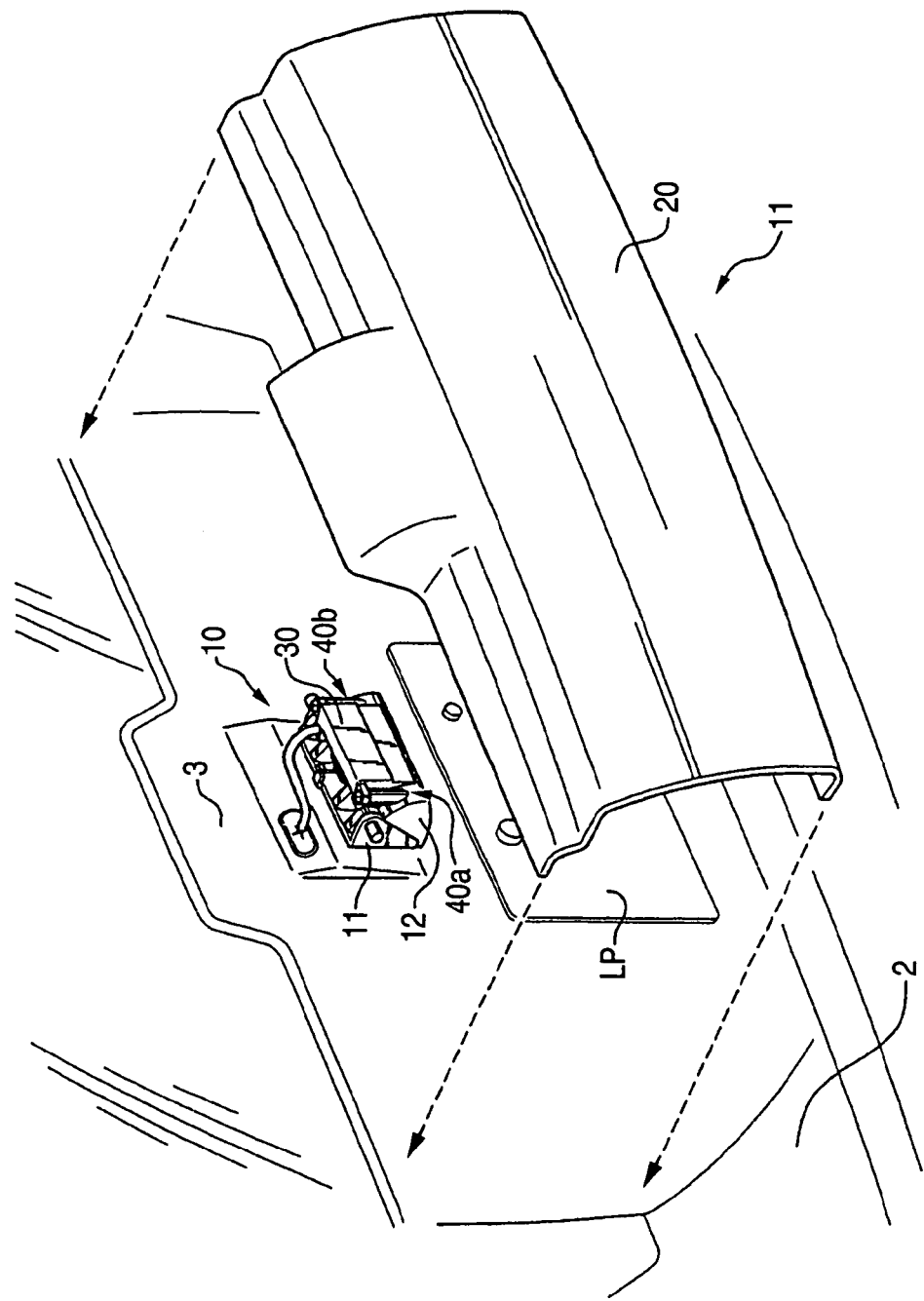
FIG. 1 is a perspective view of a rear part of a vehicle body illustrating a door handle apparatus according to a first embodiment of the invention.

Hereinafter, referring to the drawings, the details of door handle apparatuses according to embodiments of the invention will be described. Note that in the description, like reference numerals are imparted to like elements, and that a repetition of description will be omitted. In addition, in the embodiments, door handle apparatuses will be described as being provided on a back door of an automobile. Also note that when used in the following description, "front and rear, or longitudinal or longitudinally", "left and right, or transverse or transversely" and "up and down, or vertical or vertically" denote such directions in a state where door handle apparatuses are mounted on a vehicle body of the automobile.

First Embodiment

Figure 2:
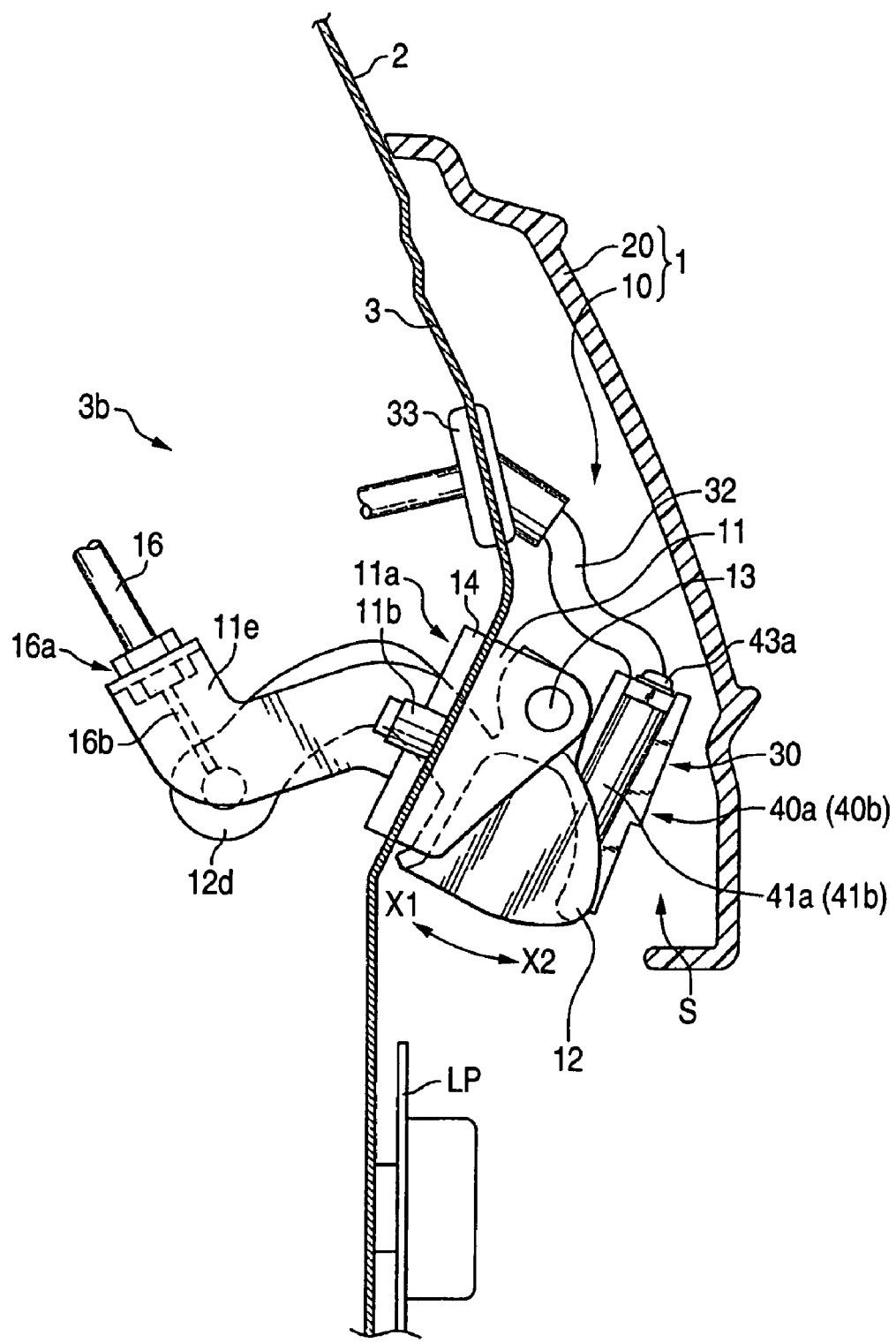
FIG. 2 is a vertical cross-sectional view of a main part of the rear part of the vehicle body around the door handle apparatus of the first embodiment.
Figure 3A:
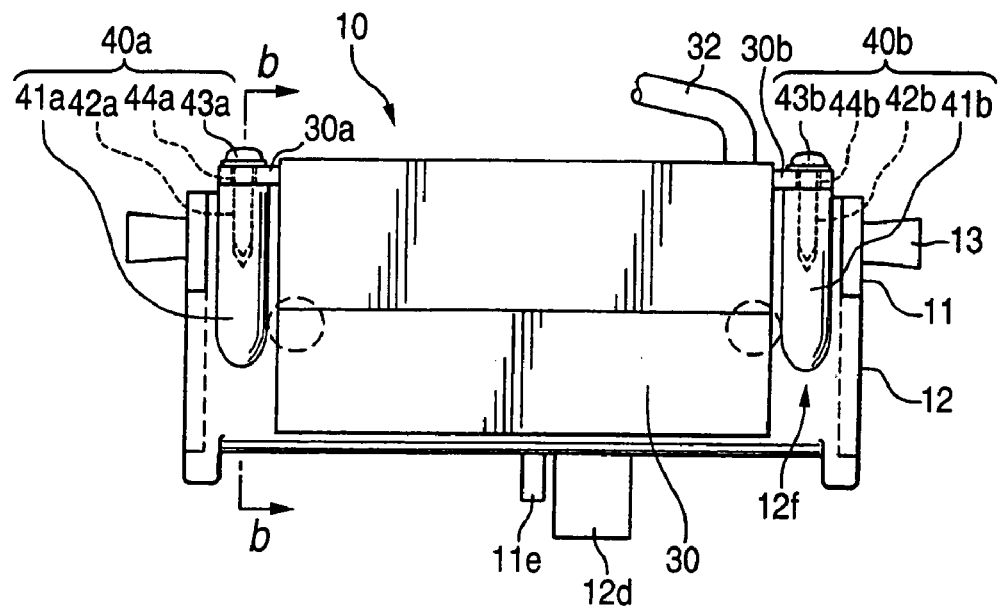
FIG. 3A is a back-side view of a door handle assembly.
Figure 3B:
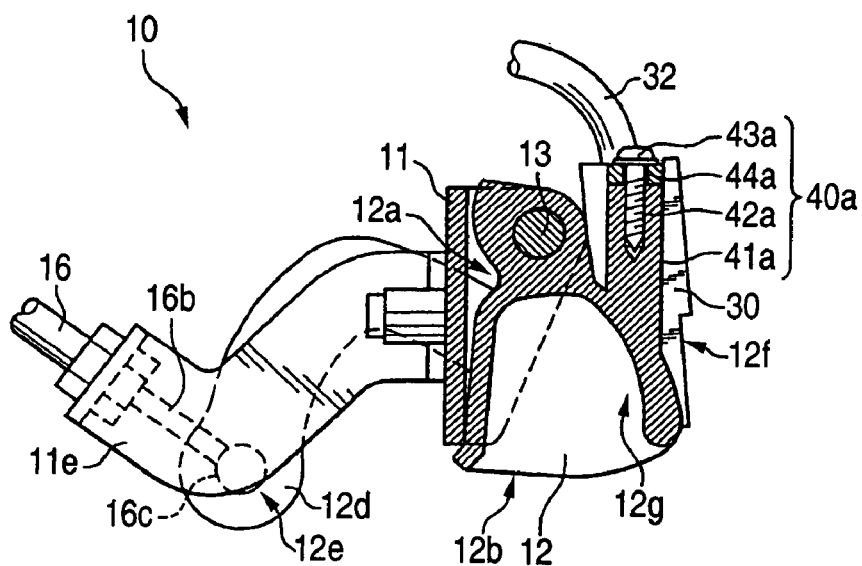
FIG. 3B is a cross-sectional view taken along the line b—b in FIG. 3A.
Figure 4A:
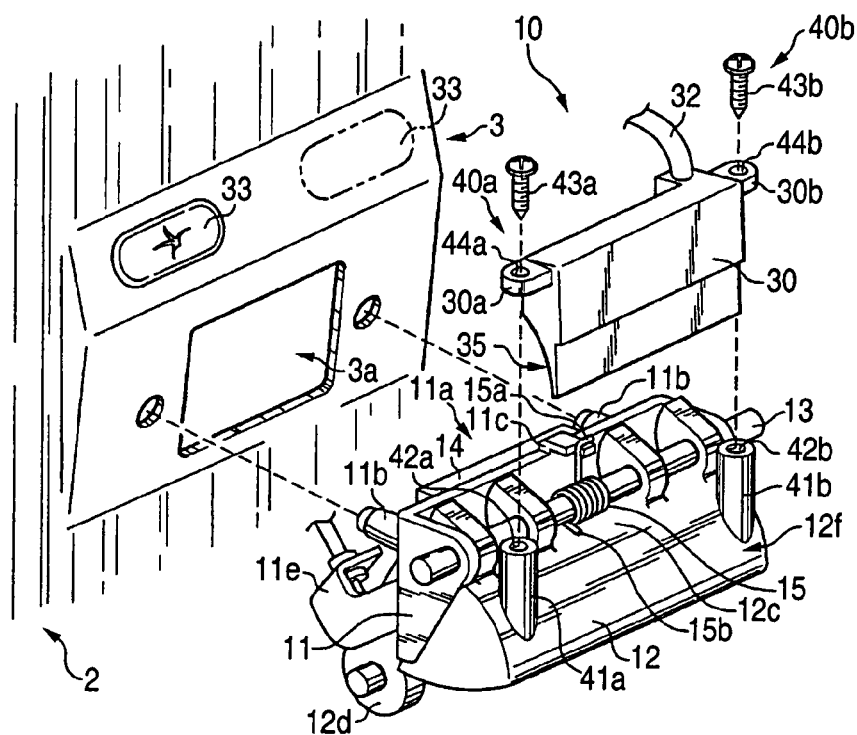
FIG. 4A is a partly exploded perspective view of the door handle assembly.
Figure 4B:
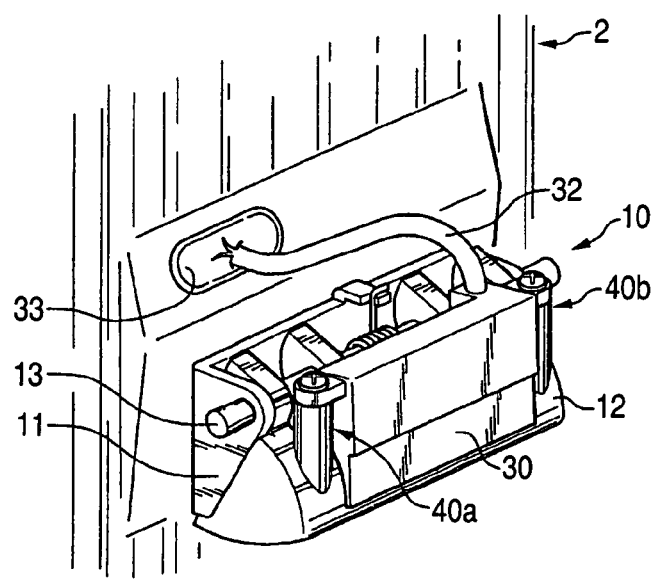
FIG. 4B is a perspective view illustrating a state in which the door handle assembly is mounted on a back door.

In the drawings to be referred to, FIG. 1 is a perspective view of a rear part of a vehicle body showing a door handle apparatus according to a first embodiment, FIG. 2 is a vertical cross-sectional view of a main part of the rear part of the vehicle body which is situated around the door handle apparatus of the first embodiment, FIG. 3 shows a door handle assembly, FIG. 3A being an enlarged back-side view of the assembly, FIG. 3B being a cross-sectional view taken along the line b—b in FIG. 3A, and FIG. 4 shows perspective views of the door handle assembly, FIG. 4A being a partly exploded perspective view of the assembly, FIG. 4B being a perspective view showing a state where the assembly is mounted on a back door.

As shown in FIGS. 1, 2, a door handle apparatus 1 includes a door handle assembly 10 having a door handle 12 and a cover member 20. Then, a detection sensor 30, which can be used as a sensor for a smart entry system and detect the approach of an operator toward the door handle 12, is provided between the door handle 12 of the door handle assembly 10 and the cover member 20. Namely, the door handle apparatus 1 is constructed such that the detection sensor 30 is so placed by making use of a space formed between the door hand 12 and the cover member 20, and in this embodiment, the detection sensor 30 is illustrated as being mounted on the door handle 12 side. Note that in a state where the door handle apparatus 1 is mounted on a back door 2 as shown in FIG. 1, the cover member 20 adopts a shape which extends, very roughly speaking, not only in a transverse direction but also in a vertical direction.

The door handle apparatus 1 according to the embodiment will be described in detail below.

As shown in FIGS. 2, 3A, 3B, 4A and 4B, the door handle assembly 10 includes a bracket 11 and the door handle 12 which is held in such a manner as to oscillate in the longitudinal directions (directions indicated by arrows X1, X2 in FIG. 2) via a shaft 13 provided so as to extend throughout the bracket 11 in the transverse direction.

As shown in FIG. 4A, the bracket 11 is mounted at a predetermined position on an outer panel 3 of the back door 2 of the automobile by a pair of left and right machine screw fastening portions 11b, 11b provided on a front part 11a of the bracket 11 with a seal member 14 being interposed between the bracket 11 and the outer panel 3. As shown in FIG. 2, a stay 11e, which is formed substantially into an S-shape as viewed from the side thereof, is provided on the front part 11a of the bracket 11 in such a manner as to project forward therefrom for holding one end portion 16a of a manipulation cable 16, which will be described later on.

As shown in FIG. 4A, a coil spring 15 is wound around the shaft 13 of the bracket 11. The coil spring 15 is locked on an upper hook 11c provided on the bracket at one end 15a thereof and is brought into abutment with an upper part 12c of the door handle 12 at the other end 15b thereof, whereby the door handle 12 is biased around the shaft 13 in the direction indicated by the arrow X1 in FIG. 2.

The door handle 12 is, as shown in FIG. 3B, formed into a U-shape as viewed in cross section in which an opening 12b is directed downwardly, and a fingers catching portion 12g of a recessed shape is formed on an inner surface of a rear part of the door handle 12. A connecting portion 12d, which is formed into a hook-like shape as viewed from the side thereof, is provided integrally on a front part 12a of the door handle 12 in such a manner as to protrude forward therefrom. A wire holding portion 12e is provided at a distal end portion of the connecting portion 12d, and a pin 16c of an inner cable 16b which is drawn out from the manipulation cable 16 is brought into engagement with the wire holding portion 12e so as to be held in place therein.

As shown in FIG. 4A, the connecting portion 12d is passed through a through opening portion 3a in the outer panel 3 together with the stay 11e of the bracket 11 when mounting the door handle assembly 10 to the outer panel 3 of the back door 2, so that the connecting portion 12 is arranged in an interior space 3b formed between an inner panel, not shown, of the back door 2 and the outer panel 3 thereof as shown in FIG. 2.

Note that the inner cable 16b is connected to a door locking mechanism, not shown, which is provided at a lower part of the back door 2 at the other end of the manipulation cable 16.

Figure 5:
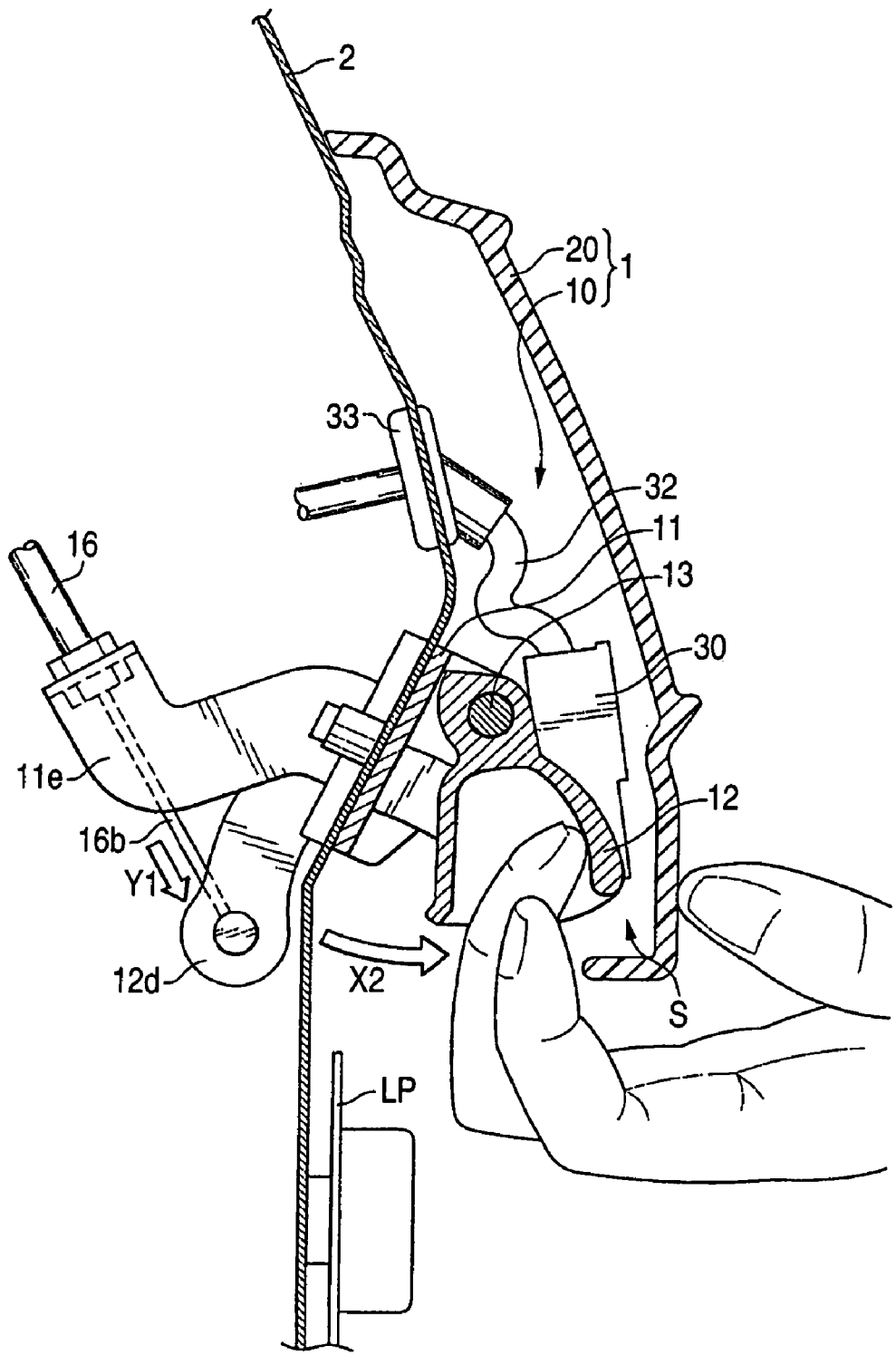
FIG. 5 is an explanatory view explaining the operation of the door handle apparatus.

From this construction, as shown in FIG. 5, when the door handle 12 is oscillated by the fingers of the operator in the direction indicated by a thick white arrow X2 in the drawing against the biasing force of the coil spring 15 (refer to FIG. 4A), the connecting portion 12d of the door handle 12 also oscillates in the direction indicated by the arrow X2 in the drawing, and the inner cable 16b is pulled in a direction indicated by a thick white arrow Y1 in the drawing by the oscillation of the connecting rod 12d. This releases a door-locked condition by the door lock mechanism (not shown).

As shown in FIGS. 1 to 4A, 4B, the detection sensor 30 is formed into a flat plate-like shape which follows in the transverse direction which is the direction in which the cover member 20 (not shown in FIGS. 3A, 3B, 4A, 4B) extends, and as shown in FIG. 4A, a lower part 35 of a front side of the cover member 20 is formed into a recessed shape matching a curved shape of a rear part 12f of the door handle 12.

A sensor, not shown, which can be used for the smart entry system is installed in the detection sensor 30, and a cable 32 connected to this sensor is drawn out from an upper part at one end of the detection sensor 30. The cable 32 has a superior flexibility, is introduced into the interior space 3b of the door handle 12 through a grommet 33, and thereafter is connected to a control unit, not shown, which is disposed in the vicinity of the driver's seat. Note that the cable 32 may be protected with a flexible cover, not shown, or may be protected by locking with a locking band a part thereof which is situated in the vicinity of the location where the cable 32 is drawn. In addition, the grommet 33 may be provided so as to be near the end of the detection sensor 30 where the cable 32 is drawn out, as indicated by a chained line in FIG. 4A.

The detection sensor 30 constructed described above is mounted on the rear part 12f of the door handle 12 with screw fastening units 40a, 40b as will be described below.

As shown in FIGS. 3A, 3B, the screw fastening units 40a, 40b include, respectively, boss portions 41a, 41b as mounting portions provided on the door handle 12 side, screw holes 42a, 42b provided in the boss portions 41a, 41b, and through holes 44a, 44b provided on the detection sensor 30 side and through which screws 43a, 43b are passed so as to be fittingly screwed into the screw holes 42a, 42b in the boss portions 41a, 41b.

The boss portions 41a, 41b provided on the door handle 12 side are integrally provided on the rear part 12f of the door handle 12 at a certain interval in the transverse direction of the cover member 20 (in the direction in which the cover member 20 extends) in such a manner as to erect therefrom. To be specific, as shown in FIG. 3A, the boss portions 41a, 41b are provided at end portions of the rear part 12f which constitute extreme ends of a width wise dimension of the door handle 12. In addition, the boss portions 41a, 41b are formed such that the vertical direction of the cover member 20 (the direction in which the cover member 20 extends as well) becomes axial directions of the boss portions 41a, 41b.

In addition, the through holes 44a, 44b provided on the detection sensor 30 side are formed, respectively, in flange portions 30a, 30b provided on left and right upper ends of the detection sensor 30.

The mounting of the detection sensor 30 using the screw fastening units 40a, 40b which are constructed described above will be performed as will be described below. Firstly, as shown in FIG. 4A, the through holes 44a, 44b in the flange portions 30a, 30b of the detection sensor 30 are aligned with the screw holes 42a, 42b in the boss portions 41a, 41b of the door handle 12, and in this state, the screws 43a, 43b are inserted into the through holes 44a, 44b. Then, the screws 43a, 43b are screwed into the screw holes 42a, 42b, whereby the detection sensor 30 can be fixed to the door handle 12.

Namely, the detection sensor 30 is fixed to the door handle 12 with the screws 43a, 43b which are inserted from an upper part 12c side of the door handle 12 (an opposite side of the door handle to a side thereof where the door handle 12 is operated).

While the detection sensor 30 mounted on the door handle 12 is oscillated together with the door handle 12 as shown in FIG. 5 as the door handle 12 is operated to be oscillated, since the detection sensor 30 is formed into the flat plate-like shape as is described above, the detection sensor 30 is made difficult to be brought into abutment with the cover member 20 which is disposed rearward.

According to the door handle apparatus 1 that is constructed as is described heretofore, the detection sensor 30 can be used as a sensor for the smart entry system. Note that, as shown in FIGS. 1, 2, a license plate LP is mounted below the door handle apparatus 1 on the back door 2.

According to the door handle apparatus 1 that is described heretofore, since the detection sensor 30 is provided between the door handle 12 and the cover member 20 as shown in FIG. 2, the placement of the detection sensor 30 can be realized which makes effective use of the space S formed between the door handle 12 and the cover member 20. Consequently, this obviates the necessity that the door handle apparatus 1 has to be constructed in the complex manner, which happens in the conventional examples where the detection sensor 30 is integrally installed in the door handle 12 or provided in the interior of the back door 2, whereby the design properties of the door handle apparatus 1 is made difficult to be damaged, and moreover, the construction can be simplified which allows for a selection of fitment of the smart entry system.

In addition, since the detection sensor 30 is provided between the door handle 12 and the cover member 20, the position where the detection sensor 30 is placed becomes a portion near an outer part (the cover member 20) of the door handle apparatus 1. Consequently, there can be obtained an advantage that the mounting and dismounting work of the detection sensor 30 is made easy to be performed. Furthermore, the failure of the detection sensor, if it happens, can be dealt with the replacement of parts, thereby making it possible to reduce the repair and replacement costs. In addition, since the detection sensor is mounted on the door handle 12, the detection sensor 30 can be exposed by removing the cover member 20 as shown in FIG. 1, thereby making it possible to obtain an advantage that the mounting and dismounting work of the detection sensor 30 is made easy to be performed.

In addition, since the detection sensor 30 is formed into the flat plate-like shape which follows the transverse direction which is the direction in which the cover member 20 extends, the detection sensor 30 can be disposed in such a manner as to extend along an inner side of the cover member 20, and the space exclusively occupied by the detection sensor 30 between the door handle 12 and the cover member 20 can be reduced, whereby the space S required for oscillation of the door handle 12 can be secured without any difficulty.

Furthermore, since the detection sensor 30 is fixed with the screw fastening units 40a, 40b which are screw fastened from the opposite side (the opening 12b side) of the door handle 12 to the side thereof where the door handle is operated, members involved in the screw fastening units 40a, 40b such as heads of the screws 43a, 43b are prevented from touching the finger tips when the door handle 12 is operated, and therefore, there is produced no feeling of physical disorder or discomfort (refer to FIG. 4A).

In addition, since the boss portions 41a, 41b are provided at the certain interval in the direction in which the cover member 20 extends and the detection sensor 30 is mounted on these boss portions 41a, 41b, the holding distance of the detection sensor 30 can be made longer, thereby making it possible to ensure the mount stability and mounting strength (refer to FIG. 2).

Since the cover member 20 is formed into the shape which also extends in the vertical direction and the boss portions 41a, 41b are formed such that the vertical direction (extending direction) of the cover member 20 becomes the axial direction thereof, the boss portions 41a, 41b can be formed longer in the vertical direction (extending direction) of the cover member 20 which has an extra space. Consequently, the mounting strength by the screws 42a, 42b can be enhanced.

Second Embodiment

Figure 6:
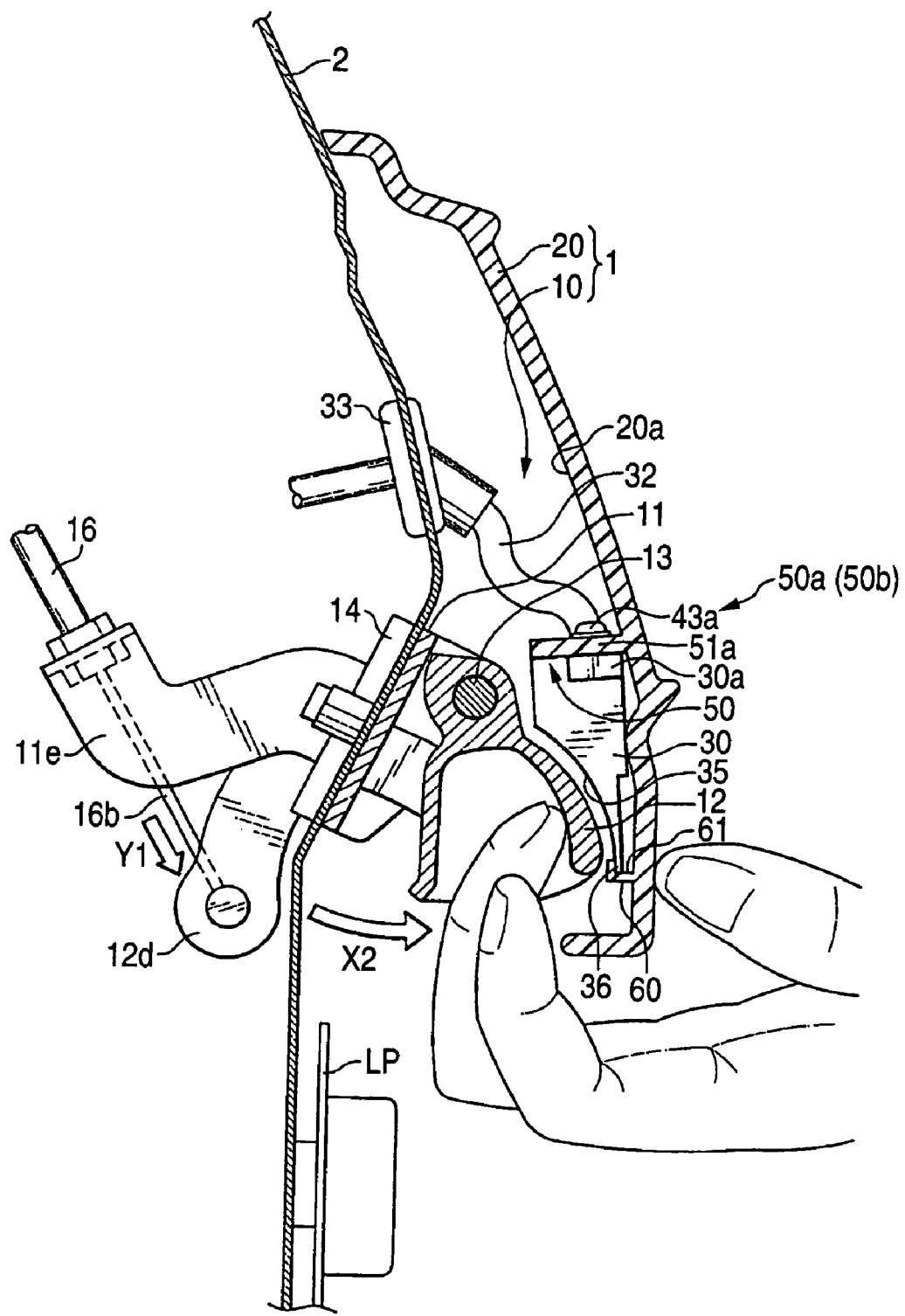
FIG. 6 is a vertical cross-sectional view of a main part of the rear part of the vehicle body around a door handle apparatus according to a second embodiment of the invention.
Figure 7A:
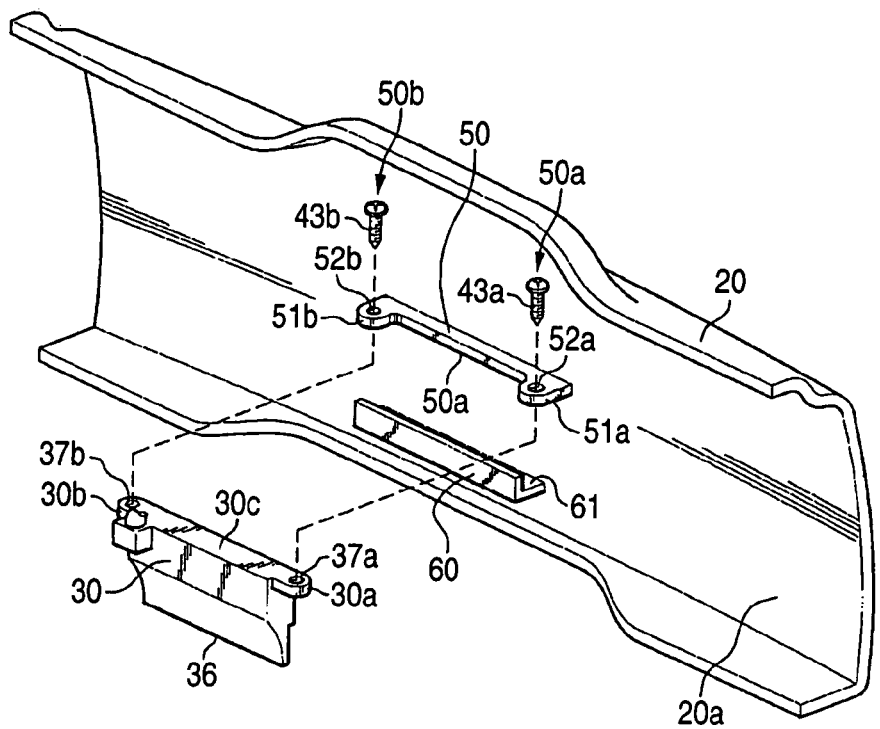
FIG. 7A is an exploded perspective view illustrating a state before a cover member and a detection sensor of the door handle apparatus according to the second embodiment of the invention are mounted.
Figure 7B:
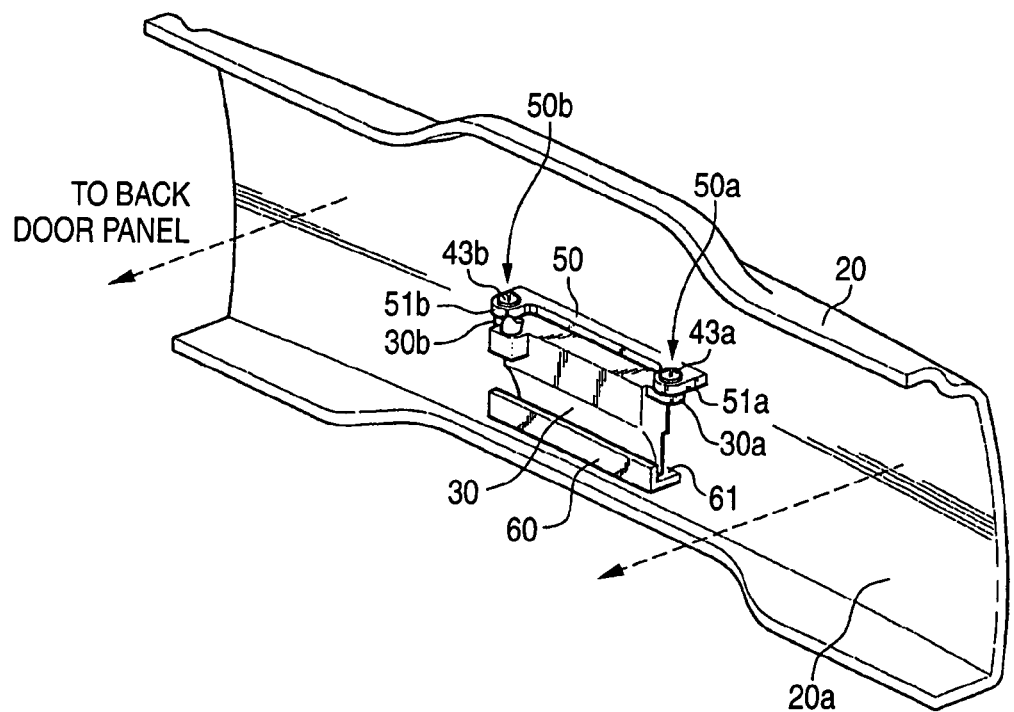
FIG. 7B is a perspective view illustrating a state after the mounting is completed.
Figure 8A:
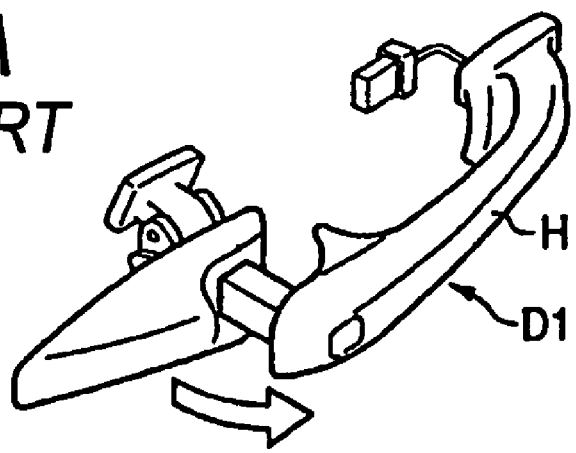
FIG. 8A is a perspective view showing a conventional door handle apparatus.
Figure 8B:
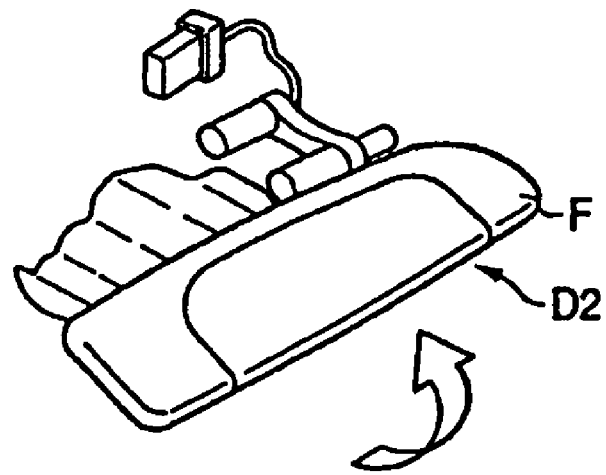
FIG. 8B is a perspective view showing another conventional door handle apparatus.
Figure 8C:
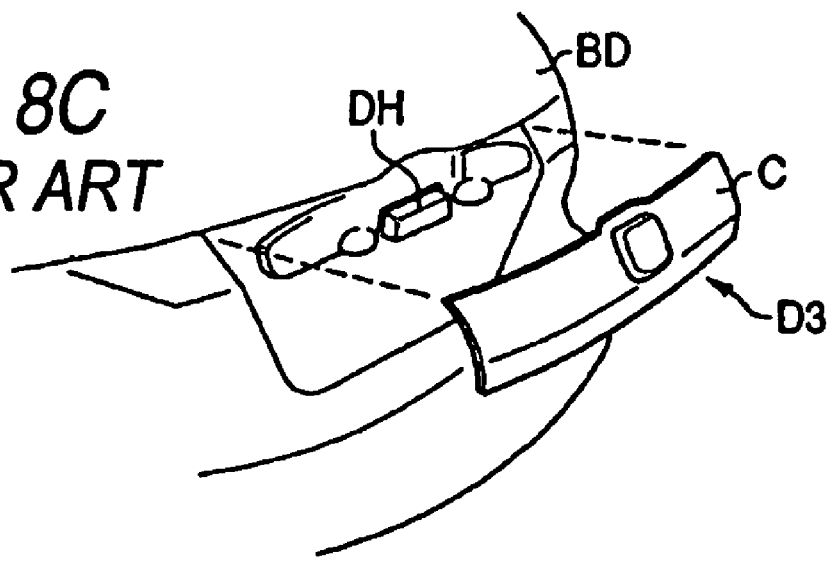
FIG. 8C is a perspective view showing a further conventional door handle apparatus.
Figure 9A:
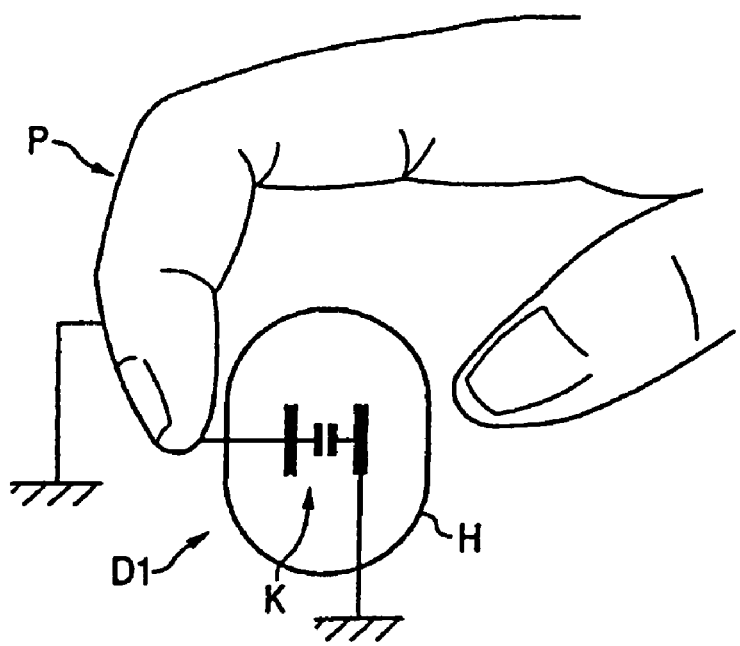
FIGS. 9A and 9B are an exemplary view illustrating a conventional recognition process.
Figure 9B:
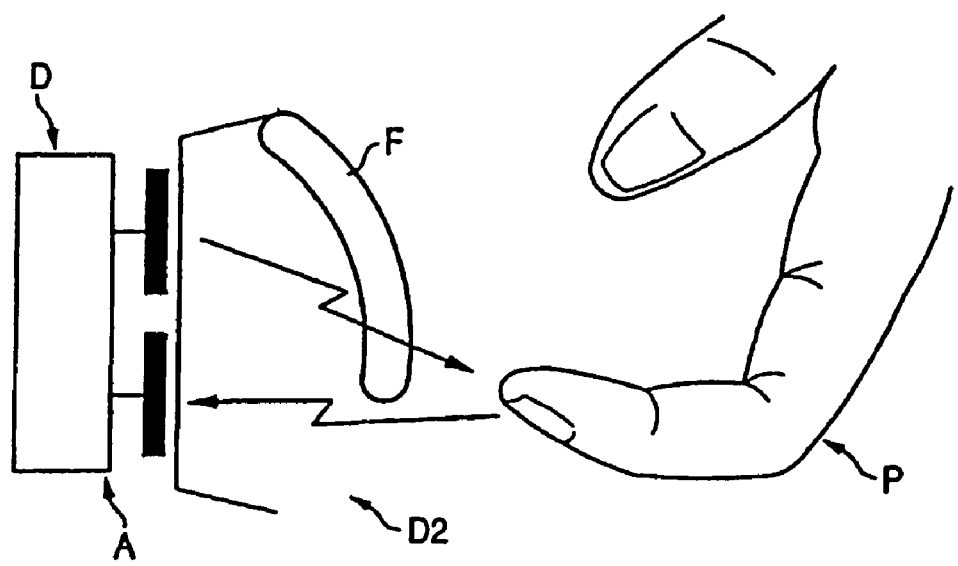

FIG. 6 is a vertical cross-sectional view of a main part of a rear part of the vehicle body around a door handle apparatus according to a second embodiment of the invention, FIGS. 7A, 7B are perspective views of a cover member and a detection sensor of the door handle apparatus according to the second embodiment, wherein FIG. 7A is an exploded perspective view illustrating a state before the detection sensor is mounted on the cover member and FIG. 7B is a perspective view illustrating a state after the mounting is completed. In the drawings that are referred to, the second embodiment is identical with the first embodiment in that a detection sensor 30 is provided between a door handle 12 and a cover member 20 but is different in that the detection sensor 30 is mounted on the cover member 20 side (a front surface 20a of the cover member 20).

As shown in FIGS. 6, 7A, 7B, a door handle apparatus 5 according to the embodiment has a fixing portion 50 and a support portion 60 which are used for mounting the detection sensor 30 on the front surface (an inner surface) 20a of the cover member 20, and the detection sensor 30 is adapted to be fixed to the cover member 20 by screw fastening units 50a, 50b which are provided on the fixing portion 50 and the detection sensor 30.

The fixing portion 50 and the support portion 60 are, respectively, provided integrally on the cover member 20 in such a manner as to extend in a direction in which the cover member 20 extends (a transverse direction thereof) and to protrude therefrom, so that the detection sensor 30 is held between them with a suitable holding force. The fixing portion 50 has mounting portions 51a, 51b constituting the screw fastening units 50a, 50b which are expanded, respectively, into a substantially semi-disc shape, and the screw fastening units 50a, 50b will be described further later on. In addition, the support portion 60 is formed into an L-shape as viewed from the side thereof, and a lower edge part 36 of the detection sensor 30 is designed to rest on a resting portion 61 of the support portion 60.

As shown in FIGS. 7A, 7B, the screw fastening units 50a, 50b include, respectively, the mounting portions 51a, 51b provided on the fixing portion 50, through holes 52a, 52b opened in the mounting portions 51a, 51b and screw holes 37a, 37b which are provided on the detection sensor 30 side and into which screws 43a, 43b which are passed through the through holes 52a, 52b in the mounting portions 51a, 51b are screwed. The screw holes 37a, 37b are provided in flange portions 30a, 30b of the detection sensor 30.

The mounting of the detection sensor 30 that is constructed as is described above will be performed as will be described below. Firstly, as shown in FIG. 7A, the lower edge part 36 side of the detection sensor 30 is rested on the resting portion 61 of the support portion 60 on the cover member 20 with the detection sensor 30 being slightly laid. Next, the detection sensor 30 is erected and inserted so that a top surface 30c of the detection sensor 50 is brought into abutment with a bottom surface 50a of the fixing portion 50, where by the detection sensor 30 is retained with the sensor being held between the fixing portion 50 and the support portion 60. Thereafter, the screws 43a, 43b are inserted into the through holes 52a, 52b in the mounting portions 51a, 51b so as to be screwed into the screw holes 37a, 37b in the detection sensor 30.

From this construction, as shown in FIG. 7B, the detection sensor 30 can be fixed to the cover member 20.

Note that since the similar shape to that described in the first embodiment is adopted for the detection sensor 30, the surface of the detection sensor 30 that faces the door handle 12 (the lower part 35 on the front surface thereof) is formed into a recessed shape which follows the expanded shape of the rear part 12f of the door handle 12, whereby the rear part 12f of the door handle 12 is made difficult to be brought into abutment with the detection sensor 30 when the door handle 12 is operated to be oscillated. In addition, any shape that is formed into the flat plate-like shape can be adopted as the detection sensor 30, and the detection sensor 30 may be formed into a quadrangular shape as viewed from the side thereof. In addition, a construction may be adopted in which a recessed portion is provided on the cover member 20 side so that the detection sensor 30 is mounted in the recessed portion.

According to the door handle apparatus 5 that is constructed as is described above, the following functions and advantages can be obtained in addition to the functions and advantages described with respect to the first embodiment. Namely, since the construction is adopted in which the mounting portions 51a, 51b of the fixing portion 50 is provided at the certain interval in the direction in which the cover member 20 extends (the transverse direction thereof) and the detection sensor 30 is mounted by the screws 43a, 43b passed through the through holes 52a, 52b in the mounting portions 51a, 51b, the holding distance of the detection sensor 30 can be made longer. Consequently, according to the door handle apparatus 5, there can be obtained an advantage that the mount stability and mounting strength of the detection sensor can be ensured.

In addition, since the detection sensor 30 is mounted on the cover member 20 side, the detection sensor 30 can be removed while the sensor is being attached to the cover member 20. Consequently, there can be provided an advantage that the mounting and dismounting work of the detection sensor 30 is made easy to be performed.

Thus, while the embodiments of the invention are described heretofore, the invention is not limited to those embodiments, and it goes without saying that the invention can be modified appropriately in accordance with the spirit of the invention. For example, while the detection sensor 30 is provided on the door handle 12 side or the cover member 20 side, the invention is not limited thereto, and the invention may adopt a construction in which the detection sensor 30 is placed between the door handle 12 and the cover member 20 via any other mounting members. In addition, while the door handle apparatus 1, 5 is described as being applied to the back door 2, the invention is not limited thereto, and the door handle apparatus may be applied to a side door.

What is claimed is:

1. A door handle apparatus comprising:
a door handle provided on a vehicle door in such a manner as to swing freely and having an outer surface facing away from the vehicle door,
a non-movable cover member secured to the vehicle door in a position covering a substantial portion of the outer surface of the door handle, wherein the door handle may swing freely in a space defined between the vehicle door and the cover member, and
a detection sensor provided between the door handle and the cover member for detecting the approach of an operator toward the door handle.

2. The door handle apparatus as set forth in claim 1, wherein the detection sensor is mounted on the door handle.

3. The door handle apparatus as set forth in claim 1, wherein the detection sensor is mounted on the cover member.

4. The door handle apparatus as set forth in claim 1, wherein the detection sensor is formed into a flat shape which extends along a direction in which the cover member extends.

5. The door handle apparatus as set forth in claim 1, wherein the cover member is removably mounted to the vehicle door so as to permit access to the detection sensor.

6. The door handle apparatus as set forth in claim 5, wherein the cover member is mounted to the vehicle door so as to remain stationary relative to the door as the door handle freely swings.

7. A door handle apparatus comprising:
a door handle provided on a vehicle door in such a manner as to swing freely and having an outer surface facing away from the vehicle door, a non-movable cover member covering substantially the outer surface of the door handle, and a detection sensor provided between the door handle and the cover member for detecting the approach of an operator toward the door handle, wherein the detection sensor is fixed by a screw fastening unit which is screwed and fastened from an opposite side to a side where the door handle is operated.

8. The door handle apparatus as set forth in claim 7, wherein the screw fastening unit includes mounting portions which are provided at a certain interval in a direction in which the cover member extends and screw holes provided in the mounting portions, and the detection sensor is fixed with screws which are inserted into the screw holes.

9. The door handle apparatus as set forth in claim 8, wherein the mounting portions are boss portions whose axial direction is the direction in which the cover member extends.

10. The door handle apparatus as set forth in claim 7, wherein the detection sensor is mounted on the door handle.

11. The door handle apparatus as set forth in claim 7, wherein the detection sensor is mounted on the cover member.

12. The door handle apparatus as set forth in claim 7, wherein the detection sensor is formed into a flat shape which extends along a direction in which the cover member extends.

13. The door handle apparatus as set forth in claim 7, wherein the cover member is removably mounted to the vehicle door so as to permit access to the detection sensor.

* * * * *